United States Patent [19]
Harp et al.

[11] Patent Number: 6,000,708
[45] Date of Patent: Dec. 14, 1999

[54] SELF TRACKING LAND VEHICLE

[75] Inventors: James J. Harp, Annandale, Va.; Robert Molten, Hagerstown, Md.

[73] Assignee: Harlab Enterprises, Inc., Annandale, Va.

[21] Appl. No.: 08/909,098

[22] Filed: Aug. 12, 1997

[51] Int. Cl.$^6$ .................................................. B60D 3/022
[52] U.S. Cl. .......................................... 280/411.1; 280/418
[58] Field of Search ................................... 280/408, 410, 280/411.1, 492, 493; 105/133, 136, 138, 96, 96.1, 3, 4.9

[56] References Cited

U.S. PATENT DOCUMENTS

| | | | |
|---|---|---|---|
| 1,083,777 | 1/1914 | Todd | 280/408 |
| 2,525,555 | 10/1950 | Manierre | 198/109 |
| 3,575,444 | 4/1971 | Veenema | 280/408 |
| 3,582,110 | 6/1971 | Bryan, Jr. | 280/408 |
| 3,860,081 | 1/1975 | Moll et al. | 180/14 A |
| 4,262,920 | 4/1981 | Mettetal | 280/408 |
| 4,397,474 | 8/1983 | Mettetal | 280/423 |
| 4,449,726 | 5/1984 | Strifler et al. | 280/81 A |
| 5,037,121 | 8/1991 | Gallatin | 280/426 |
| 5,580,211 | 12/1996 | Mengal | 414/786 |
| 5,632,350 | 5/1997 | Gauvin | 180/9.44 |

OTHER PUBLICATIONS

Brochure of Rotek, Incorporated "Series 2100 Econo-Trak® Bearings", admitted prior art (2 pages).

*Primary Examiner*—Robert J. Oberleitner
*Assistant Examiner*—Daniel Yeagley
*Attorney, Agent, or Firm*—Nixon & Vanderhye P.C.

[57] ABSTRACT

A self tracking land vehicle includes a number of cargo or passenger cars and a drive car. Each cargo car may have a chassis with a standardized container mounted on it. At least front and rear axles which have at least two inflatable tires each are provided for each of the cars. The front axle is pivotable about a vertical axis with respect to the car, and the rear axle is fixed. A substantially transversely rigid connection connects the front of each car to the rear of the preceding car, to form a land train. Each car and associated transversely rigid connection is substantially the same length, and all of the axles of all of the cars are spaced from each other substantially the same effective longitudinal distance, so that the train is self tracking. At least some of the axles of some of the cars may be driven by an electric motor, and a lead drive car is provided having a front with at least one steerable axle, a power plant in the front car producing electricity to drive all of the electric motors.

20 Claims, 9 Drawing Sheets

SELF TRACKING LAND VEHICLE

BACKGROUND AND SUMMARY OF THE INVENTION

There are many locations which are inaccessible by railroad or boat that require large quantities of supplies in order to be livable, and/or which have natural resources that are difficult to move to other areas of the world. In such places particularly it would be desirable to have a land train, that could move over natural terrain (that is without the need for train tracks) so that a large quantity of material could be moved at a time, as compared with the inefficient technique driving individual trucks. However, there are practical difficulties associated with such overland trains, perhaps the foremost of which is the difficulty of steering the train. If an overland train is long enough so that it obtains close to optimum efficiency in the transport of goods or passengers, then it is very difficult to make the rear end of the train follow the front end in moving over dirt or gravel roads, or bare earth or sand, or snow covered land, given the normal unevenness of terrain. Such land trains virtually universally need to move in a path that is at least somewhat serpentine, meaning that it is almost impossible using present technology to get the rear car to track (follow the same path as) the lead car.

According to the present invention a self tracking land vehicle is provided which can effectively be used in almost any terrain except actual mountains. The land train according to the invention is particularly effective at transporting cargo since each car of the train may include a standardized container mounted on a chassis, the standardized containers being readily loadable onto and unloadable from the chassis. A key to making the train self tracking is to provide only the front axle or axles as pivotal about a substantially vertical axis, for each of the cars, and to space all of the axles of all of the cars in the train substantially the same effective longitudinal distance. It is also desirable to provide a substantially transversely rigid (that is a horizontal dimension substantially perpendicular to the longitudinal dimension) connection of the front of each car to the rear of the car in front of it.

According to one aspect of the present invention, a self tracking land vehicle is provided comprising the following components: At least four cars, each car having a front end, a rear end, a bottom, and a top, and extending from the front end to the rear end in a generally horizontal longitudinal dimension. Each car having at least first and second axles with at least two inflatable tires each associated with each of the axles. The first axle associated with each car mounted closer to the front end than the rear end of the car, and mounted for pivotal movement about a substantially vertical axis with respect to the car bottom. The second axle associated with each car mounted closer to the rear end than the front end, and the second axle mounted with respect to the car bottom so that it cannot pivot about a substantially vertical axis. A substantially transversely rigid connection from the front end of each first axle of each car to the rear end of a leading car so that the cars are connected together in a land train. Each car and associated transversely rigid connection of the train have substantially the same length. And all of the axles of all of the cars spaced from each other at a substantially uniform effective longitudinal distance apart so that the land train is self-tracking, all of the cars substantially precisely following the same path of movement.

A motor or engine may be provided for powering at least one axle of each car so that all of the cars are driven. Typically a lead drive car is also provided. The lead drive car has a front end with at least one steerable axle with at least two inflatable tires adjacent the front end, and a rear end, and at least one non-steerable axle adjacent the rear end, the non-steerable axle mounted with respect to the drive car so that it cannot pivot about a substantially vertical axis. Preferably a power plant (such as a diesel engine) is provided in the drive car for producing electricity. An electric motor is provided for at least some of the cars for driving at least one axle of those cars, the electric motors receiving electrical energy from the power plant.

Typically the first and second axles each comprise a pair of ganged axles, and include a center point. Then the center points of all of the axles are spaced from each other substantially the same longitudinal distance.

The substantially transversely rigid connection between the cars preferably allows limited vertical relative movement, and pivotal relative movement about a longitudinal central axis, of each car with respect to the preceding car. For example, the connection comprises the following components: two transversely spaced clevis assemblies mounted to each car, and a hinge pin associated with each clevis assembly; a swivel pin; first and second swivel bushings operatively connected to the swivel pin; and first and second wishbone assemblies each operatively connecting a swivel bushing to two hinge pins, so that the cars may move vertically with respect to each other by pivotal movement about the hinge pins, and may move pivotally with respect to each other by pivotal movement of the swivel bushings with respect to each other. Also, thrust washers and plates preferably engage each swivel bushing, and swivel nuts are provided for holding the swivel bushings on the swivel pin.

Typically the land train comprises at least eight cars, such as ten or twelve cars, and a standardized 20 foot container is mounted on top of a plurality of the cars (such as all of the cars except for the drive car if a cargo land train). If additional power is necessary one of the cars of the train spaced from the drive car may have another power plant therein, or the drive car may have space for cargo and passengers and the power plant provided in another car.

According to another aspect of the present invention, a car for a self tracking land vehicle is provided. The car comprises the following components: A chassis having a front end, rear end, bottom, and top, and extending from the front end to the rear end in a generally horizontal longitudinal dimension. A standardized container mounted on the chassis top. At least first and second axles with at least two inflatable tires each associated with the chassis. The first axle mounted closer to the front end than the rear end of the chassis, and mounted on an assembly for pivotal movement about a substantially vertical axis with respect to the chassis bottom. The second axle mounted closer to the rear end than the front end, and the second axle mounted with respect to the chassis bottom so that it cannot pivot about a substantially vertical axis. A substantially transversely rigid connection extending outwardly from the first axle assembly past the front end of the chassis. And a motor or engine mounted to the chassis for driving at least one of the axles.

The chassis and the container are preferably each about 20 feet long, and the effective spacing between the first and second axles is about 7 to 9 feet (e.g. 8 feet) and the connection extends longitudinally about 3 to 5 feet (preferably about 4 feet) from the axle pivot.

According to another aspect of the present invention a method of transporting cargo or passengers over land in a train, such as described above, is provided. The method comprises the steps of: (a) connecting the at least four cars together in a land train so that the front axle at the front end of each car, except the lead car, is connected to the rear end of the preceding car by a substantially transversely rigid connection, and so that each axle of each car is spaced substantially the effective longitudinal spacing x from the next axle; and (b) powering (e.g. pulling) the front end of the first car over land in an at least somewhat serpentine path so that the inflatable tires of each car substantially precisely self-track in the path of the inflatable tires of the preceding car.

Preferably step (b) is practiced by connecting the front end of the leading car of the land train to the rear end of a drive car, the drive car having a rear axle with inflatable tires spaced from the front axle of the leading cargo or passenger car substantially the effective longitudinal spacing x, and the drive car having steerable front inflatable tires; and by steering the drive car. Typically the land train has at least eight passenger or cargo cars, and the method comprises the further step of driving at least some of the axles of cargo or passenger cars to facilitate movement of the land train over land. Typically at least some of the cars are cargo cars having a standard transport container mounted on the top thereof; and preferably the method also comprises the further step of loading and unloading cargo from the train by lifting the container onto, or off of, respectively, the car top.

Step (a) is typically practiced to allow limited vertical relative movement, and pivotal relative movement about a longitudinal central axis, of each car with respect to the preceding car. The drive car typically includes a power plant for producing electricity, and only some of the passenger and cargo cars have electric motors for driving an axle or axles thereof; and the method comprises the further step of supplying electricity from the power plant to the electric motors of the passenger and cargo cars to drive an axle or axles thereof.

It is the primary object of the present invention to provide a structure and method for effectively transporting cargo or passengers over land, including natural terrain, in a self tracking train. This and other objects of the invention will become clear from an inspection of the detailed description of the invention and from the appended claims.

DETAILED DESCRIPTION OF THE DRAWINGS

A self-tracking land vehicle according to the present invention is illustrated schematically at 10 in FIGS. 1A, 1B, 6 and 7. The land vehicle 10 includes at least four cars 11, and preferably at least eight cars 11, e.g. ten or twelve cars. Each car 11 has a front end 12, a rear end 13 spaced from the front end 12 in a generally horizontal longitudinal dimension 14, a bottom 15, and a top 16. Typically a chassis, shown generally by reference numeral 17, is provided, including cross bars 18 and 19 at the front 12 and rear 13 thereof, and longitudinally extending I-beams or like frame elements 20 extending from the front to the rear thereof.

When the cars 11 are cargo cars, preferably a standardized container 21, such as a standardized twenty foot container, is mounted on the top 16 of the car 11, and connected to the chassis 17 in any suitable manner using clamps, nuts and bolts, guides, or the like. The standardized containers 21 typically have doors—shown only schematically at 22 in FIG. 1B—which open at one end of the container 21, which is at the front 12 or the rear 13 of each car 11. If the size of standardized containers changes in the future, then other dimensions may be provided, as is appropriate, however with standard twenty foot containers 21 the chassis 17 is also preferably about twenty feet long.

Each car 11 has at least first and second axles, at the front and rear thereof, with at least two inflatable tires associated with each of said axles. While a wide variety of different forms of axles may be provided, in the preferred embodiment according to the invention, the first and second axles each comprise a ganged pair of axles in an axle assembly. A first, front, ganged axle pair is shown schematically by reference numeral 24 in FIGS. 1B and 2B, while a rear, second, ganged axle pair is shown schematically by reference 25 in FIGS. 1A, 1B and 2B.

Each of the ganged axle pair assemblies 24, 25 includes a frame 26 (see FIG. 1B) mounting a pair of horizontal axles 27, 28 which extend in a transverse dimension 29, that is a generally horizontal dimension substantially perpendicular to the longitudinal dimension 14. A central portion of the frame 26 is provided with a mounting structure for mounting the frame 26 to the bottom 15 of the chassis 17. That mounting structure, which for the front axle assemblies 24 is shown generally by reference 30 in FIGS. 1A and 2B, comprises any suitable structure for allowing pivotal movement of the axle assembly 24 with respect to the bottom 15 of the chassis 17 about a substantially vertical axis 31. One example of such a structure is a conventional bearing assembly such as a series 2100 Econo-Trak® bearing assembly available from Rotek Incorporated of Aurora, Ohio. For the rear axle assemblies 25, the frame 26 is not mounted by a pivotal connection, but rather a fixed connection, shown schematically a 32 in FIGS. 1B and 2B. The connection 32 may be any suitable conventional connection, such as plates which are welded or bolted to the chassis 17 and the frame 26 which are in turn bolted to each other, or a wide variety of other structures. For example, instead of just the structure 32, accessory blocks 33 (see FIG. 1B) or the like may also be provided for fixing the frame 26 of the rear axle assembly 25 to the bottom 15 of the chassis 17.

As earlier indicated, each axle 27, 28 includes at least two inflatable tires, shown at 34 in the drawings. The inflatable tires 34 are entirely conventional, and will typically be conventional truck tires. For example, the tires 34 may be twenty inch tires with twenty pounds per square inch pressure. The axles 27, 28 also are completely conventional, for example conventional truck axles.

Figure 4:
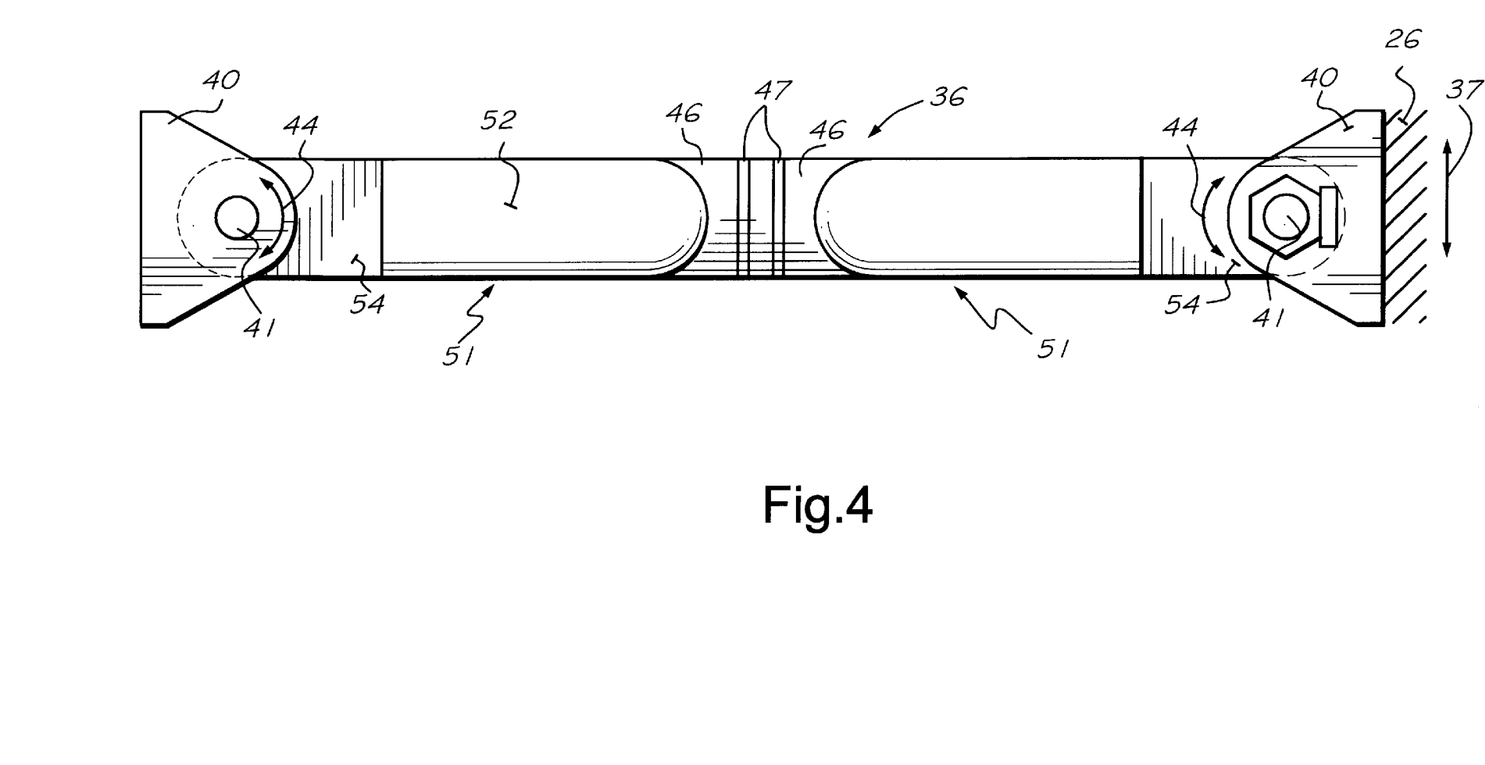
FIGS. 4 and 5 are side and end views, respectively, of the connection of FIG. 3.
Figure 5:
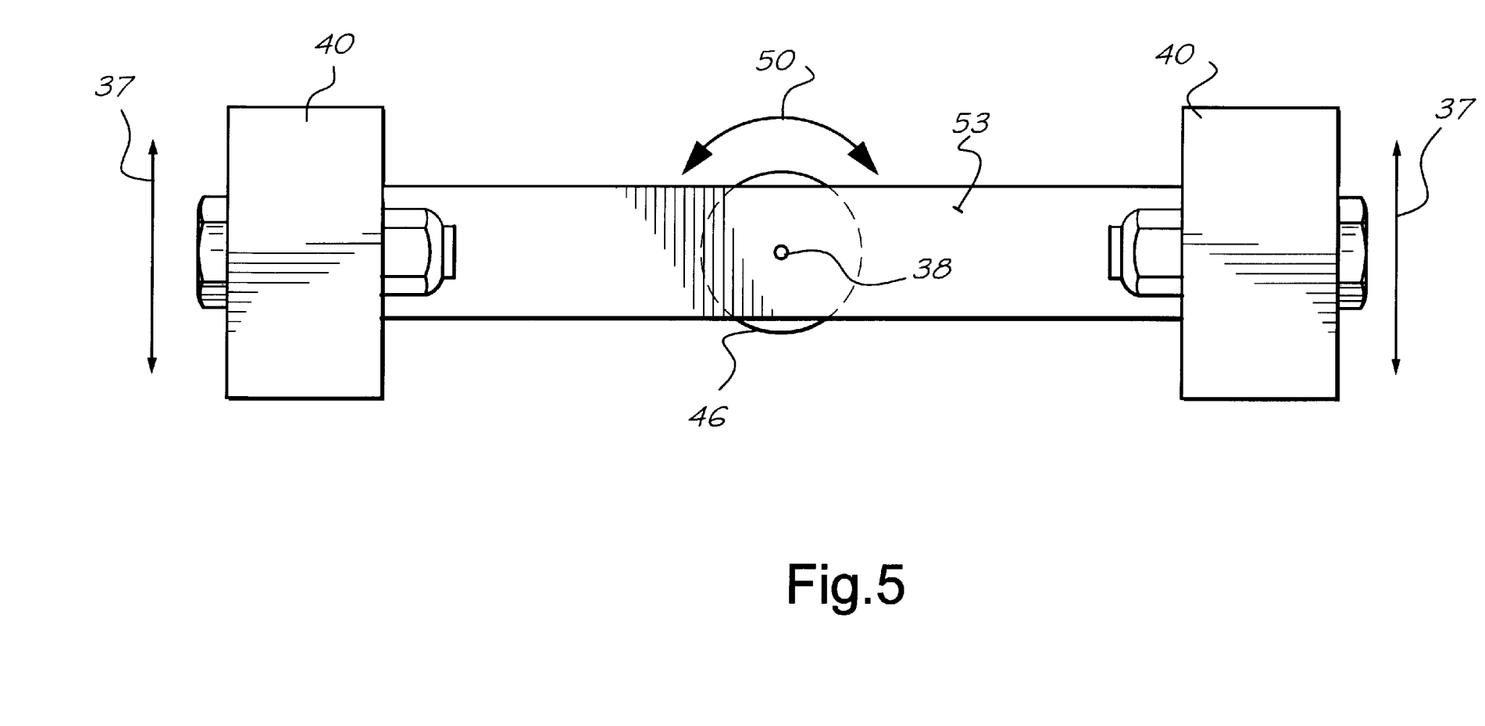
Figure 6:
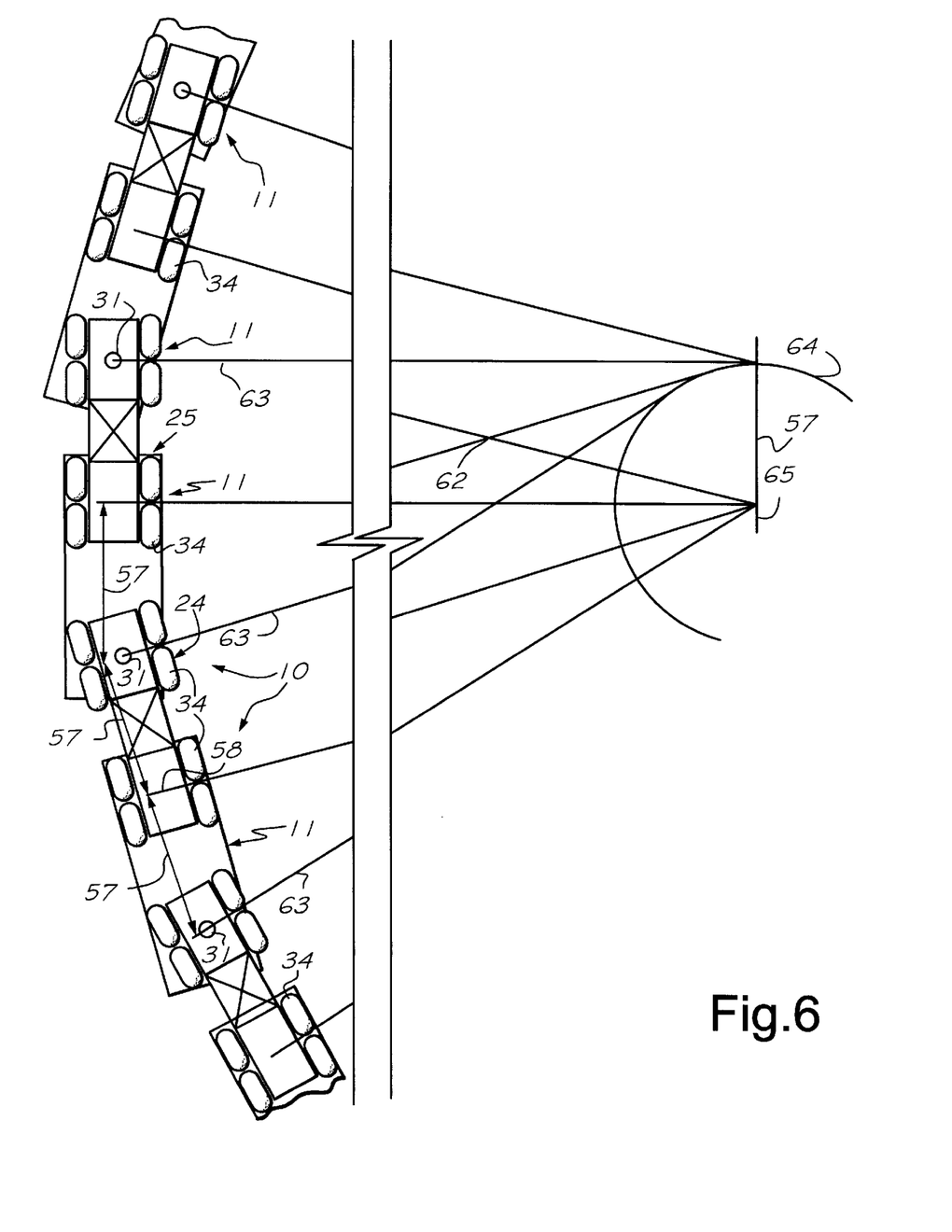
FIG. 6 is a schematic geometric diagram illustrating the geometry of the self tracking nature of the cars of the train of FIGS. 1 and 2.
Figure 7:
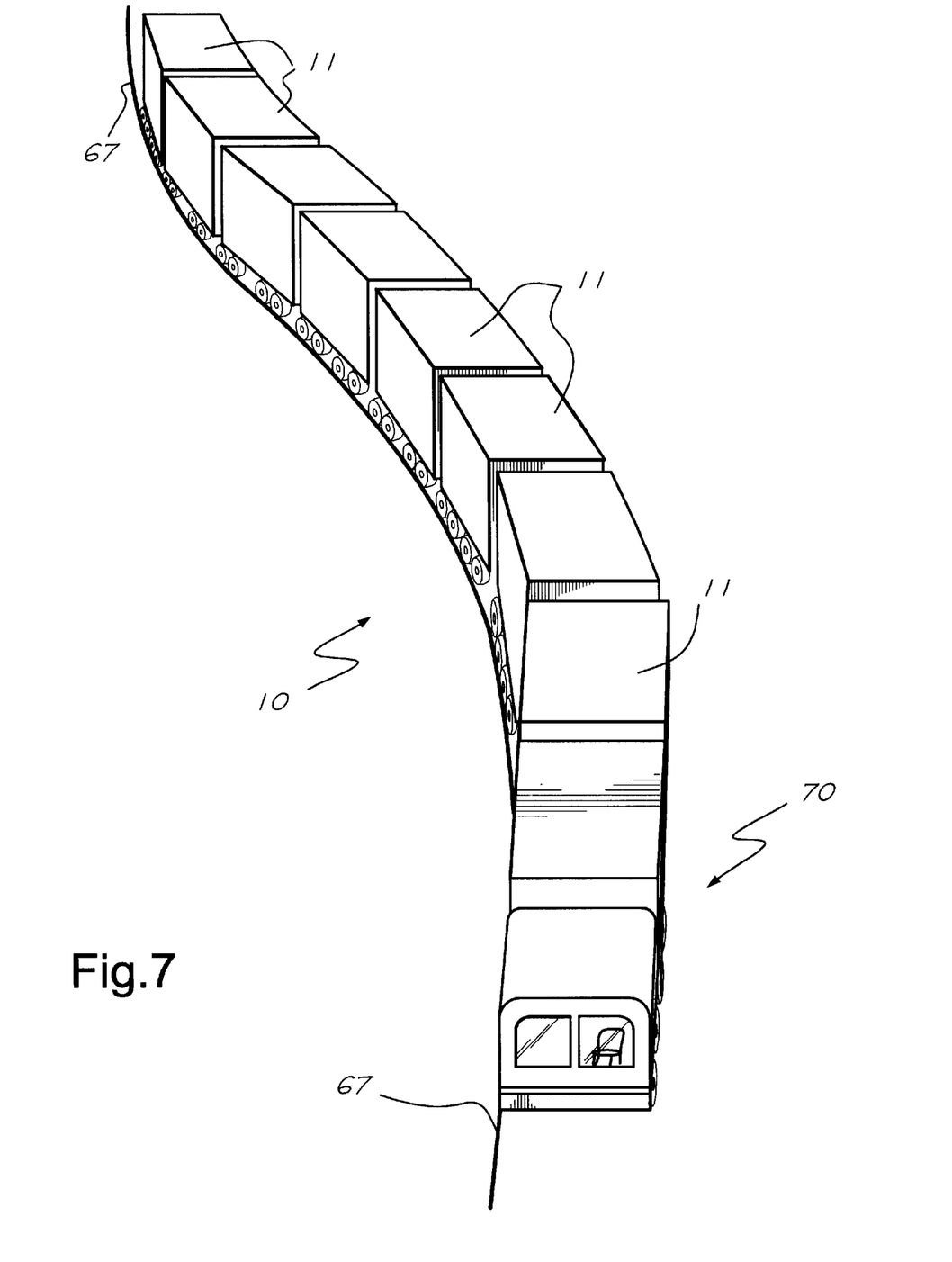
FIG. 7 is a top, front, perspective view of a land vehicle according to the present invention showing self tracking movement in a serpentine path.

The land vehicle 10 also comprises a substantially transversely rigid connection—shown schematically by reference numeral 36 in FIGS. 1 through 5—from the front end of each first axle assembly 24 (e.g. frame 26 thereof to the rear end 13 of the car 11 in front of it, so that the cars 11 are connected in a land train (best seen in FIGS. 6 and 7).

Figure 3:
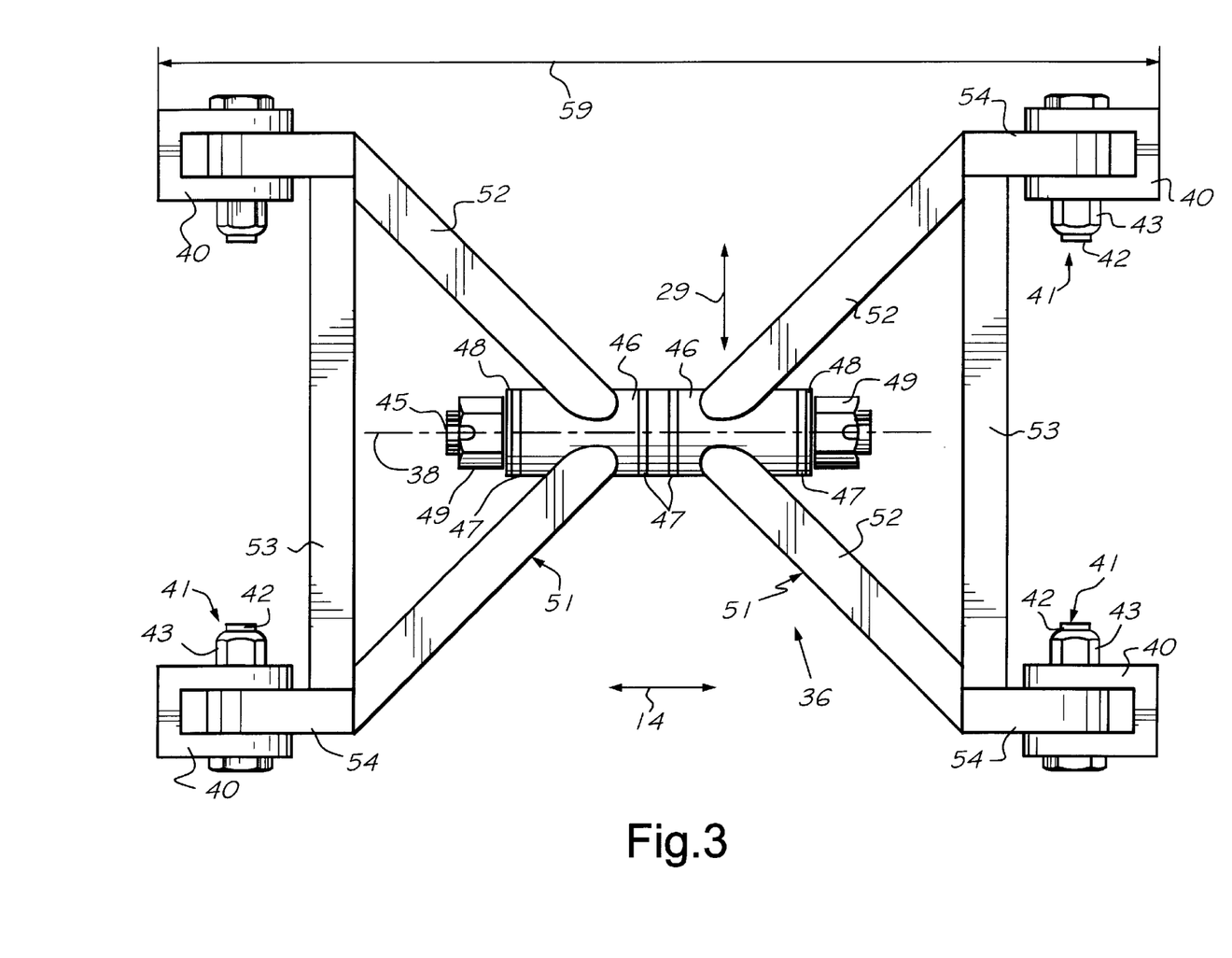
FIG. 3 is a top plan view of a preferred embodiment of the connection between cars of the train of FIGS. 1 and 2.

While the connection 36 may comprise a wide variety of conventional elements that are substantially rigid in the transverse dimension 29, while allowing limited vertical relative movement, as indicated by arrows 37 in FIGS. 4 and 5 and limited pivotal relative movement about a longitudinal central axis 38 (see FIGS. 3 and 5), the structure 36 illustrated in detail in FIGS. 3 through 5 is preferred.

The connection 36 illustrated in FIGS. 3 through 5 includes two sets of clevis assemblies mounted to each car 11 and spaced from each other in the transverse dimension 29. For example, one set of clevis assemblies 40 is mounted to the frame 26 of a front axle assembly 24, extending outwardly therefrom, while the other set of clevis assemblies 40 is mounted to the stationary frame 26 of the rear axle assembly 25 of the leading car 11.

The connection 36 further comprises a hinge pin 41 associated with each clevis assembly 40 and defining a pivot axis parallel to the transverse dimension 29, the hinge pins 41 of the clevis assemblies 40 associated with any one car 11 being in line with each other, as is clear from FIGS. 3 and 4. Each of the hinge pins 41 preferably comprises a bolt having a threaded end 42 on which a hinge pin nut 43 is tightened. The hinge pins 41 allow pivotal movement about the axes defined thereby, this movement is indicated by the arrows 44 in FIG. 4, which in turn allows limited relative vertical movement, in dimension 37, of the two cars 11.

The connection 36 further comprises a swivel pin 45 and first and second swivel bushings 46 operatively connected to the swivel pin 45 (that is surrounding a central portion thereof as seen in FIG. 3). Thrust washers 47 may be provided between the swivel bushings 46 and at the ends thereof, and the swivel bushings 46 are typically held in place by thrust plates 48 and swivel nuts 49 which engage the threaded ends of the swivel pin 45. The swivel bushings 46 can rotate with respect to each other about the axis 38, to allow movement in the direction of the arrow 50 in FIG. 5, and thus allow twisting movement of one car 11 with respect to the other, in vertical movement in the dimension 37 of the tires 34 on one side of each car 11 with respect to the tires on the other side.

The swivel bushings 46 are connected to the hinge pins 41 by first and second wishbone assemblies 51. The wishbone assemblies 51 preferably each have a substantially triangular frame element defined by two apex elements 52 which are welded or otherwise attached to a swivel bushing 46, and a base/cross piece 53 which rigidly connects the ends of the apex elements 52 opposite the swivel bushing 46. Extending in the dimension 14 from the base 53 are the ears 54, which are received by the clevis assemblies 40 and have an opening through which a hinge pin 41 passes. It will be seen from an inspection of the structure 36 in FIGS. 3 through 5 that while movement in the dimensions 37, and as indicated by arrows 44, 50 (and thus some relative movement between cars in the dimension 14) is allowed, the connection 36 is substantially rigid in the transverse dimension 29.

All of the components of the connection 36 preferably are metal, such as steel, although perhaps thrust washers 47 are of a low friction material, such as polytetrafluoroethylene or another hard plastic.

Figure 1A:
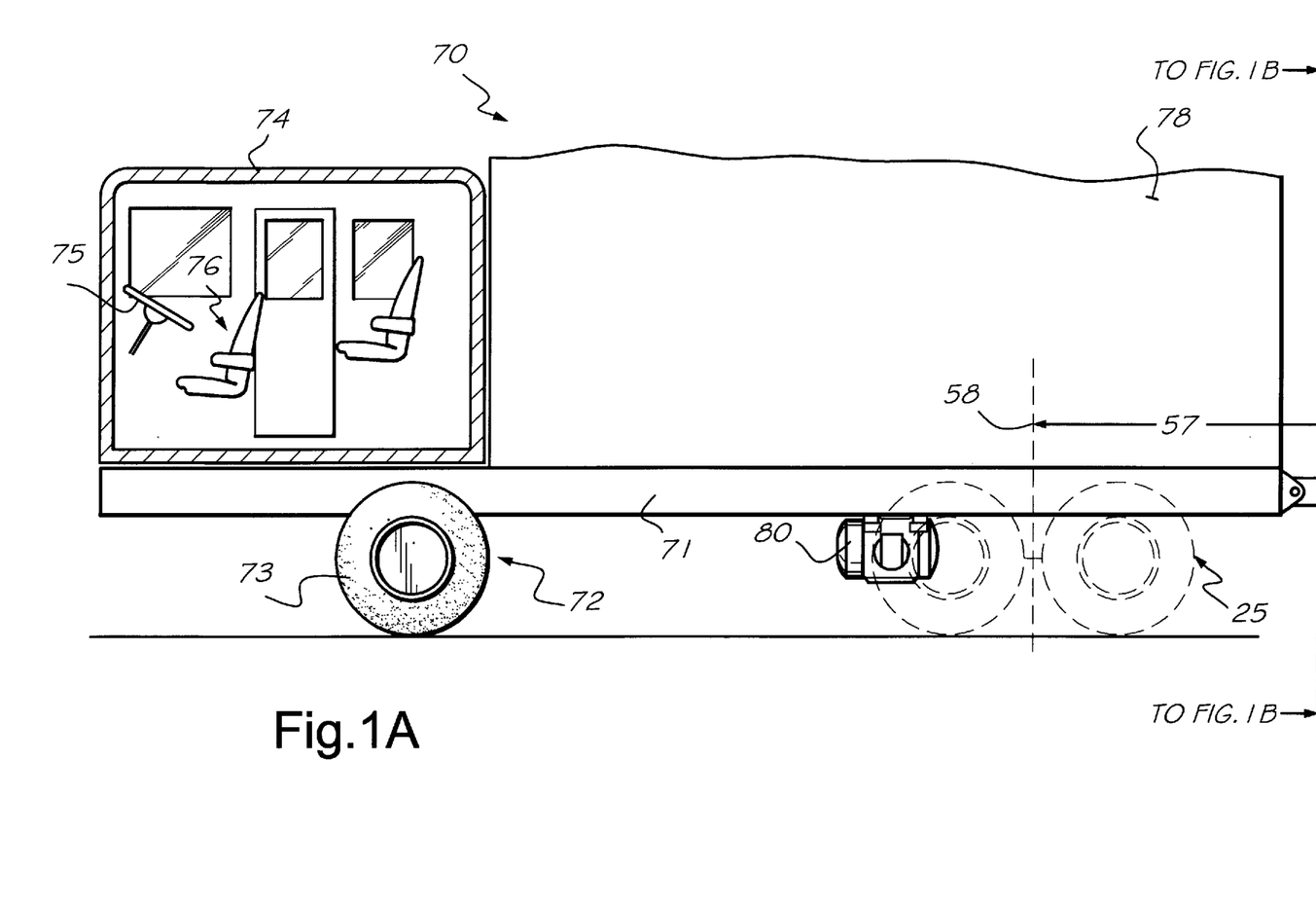
FIGS. 1A and 1B provide a side schematic view illustrating two cargo cars of the train according to the invention connected up to a drive car, the cab of the drive car being shown in cross section.
Figure 1B:
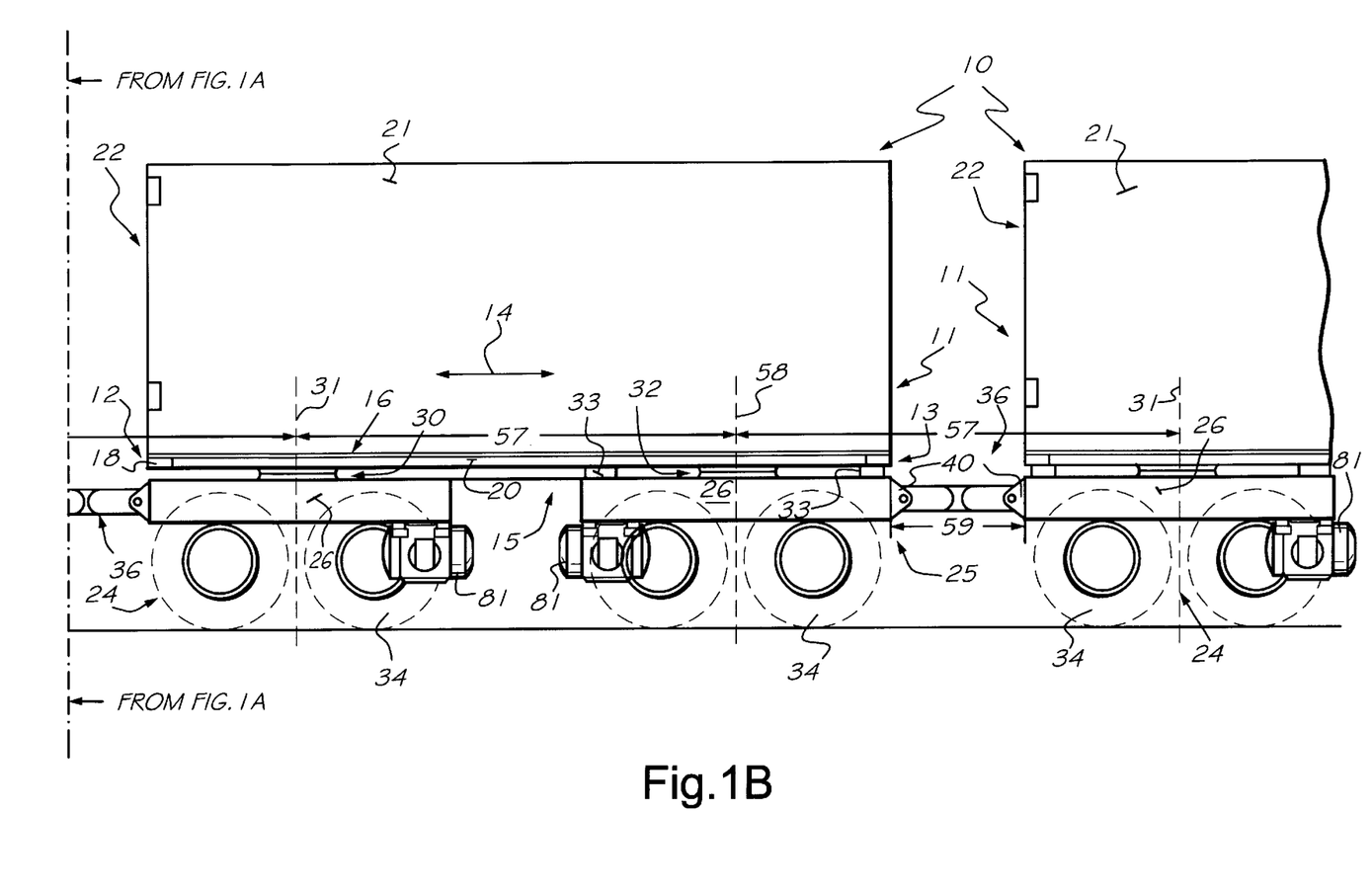

One of the most important single elements in getting the land vehicle 10 to be self tracking is the spacing between the axles. The spacing must be uniform. For example, the effective spacing in the longitudinal dimension 14 between the axle assemblies 24, 25 is the spacing 57 illustrated in FIGS. 1A and 1B, from the longitudinal center of the front axle assembly 24 (that is the pivot axis 31) and the longitudinal center of the rear axle assembly 25 (indicated by imaginary line 58 in FIGS. 1A and 1B). Substantially the same spacing 57 is also provided—as illustrated in FIGS. 1A and 1B—between the longitudinal center point 58 of the rear axle assembly 25 of the leading car 11 in FIG. 1B and the pivot axis 31 of the front axle assembly 24 of the next car 11 in line. For situations where the axle assemblies 24, 25 are only each a single axle, then the centers 31, 58 will essentially bisect the single axle.

For the preferred embodiment illustrated in the drawings, where a standard twenty foot container 21 is provided for each of the cars 11, the spacing 57 is about eight feet (e.g. 7–9 feet), while the longitudinal dimension 59 (see FIG. 3) of the connection 36 is about four feet (e.g. between 3–5 feet), which means that the containers 21 are also spaced from each other about four feet. Note that this spacing between the containers is desirable in that it does not allow easy access to the interior of the container 21 through the doors 22 thereby minimizing the possibility of large scale theft of the contents of the container 21.

The results achieved from the construction described above include almost completely precise self tracking of the land vehicle 10 (e.g. a deviation typically less than about six inches from the first to last car in an eight car train). FIG. 6 shows the relative positions of the cars 11 of the land train 10 as the land train 10 moves in a curved path, and shows how the rear tires 34 of each of the cars 11 follows in a virtually identical path. As seen in FIG. 6, the geometric relationship between the cars 11 when self tracking is such that the centers 58 of the rear axle assemblies 25 are on common radii 62 of a circle (the radius 62 being—for the dimensions illustrated in the drawings—about 90 feet 6 inches), whereas the axes 31 are on lines 63 which make a tangent to a circle 64 having the intersections of the radii 62 at the center 65 thereof. The circle 64 has a radius that is the same as the spacing 57 (i.e. about eight feet in the illustrated embodiment).

FIG. 7 is a schematic view showing self tracking of the land train 10 as the cars 11 move through a serpentine path. The rear tires 34 of all of the cars 11 will allow follow, virtually precisely, the serpentine path 67.

It is necessary to steer and to power the train 10. For facilitating that purpose a different drive lead car 70 (FIGS. 1A, 2A and 7) is provided. The drive lead car 70 has a rear axle assembly 25 substantially the same as for the cars 11, that is so that there is no pivotal movement with respect to the chassis 71 about the longitudinal center 58 of the rear axle assembly 25. The effective longitudinal spacing, in dimension 14, between the pivot axis 31 of the first cargo or passenger car 11 and the center line 58 for the rear axle assembly 25 of the drive car 70 is also the spacing 57.

The drive car 70 also includes a front axle assembly 72 including a steerable axle and at least two inflatable tires 73 at opposite ends thereof. The steerable nature of the assembly 72 is not illustrated in the drawings because it can be of any conventional type typically used with trucks or other land vehicles. Mounted adjacent the front of the drive car 70 typically is a cab 74 which has a steering wheel or the like 75 and seats 76 for the driver and relief drivers, passengers, or guards. Typically a toilet facility 77 (see FIG. 2A) is also provided.

Figure 2A:
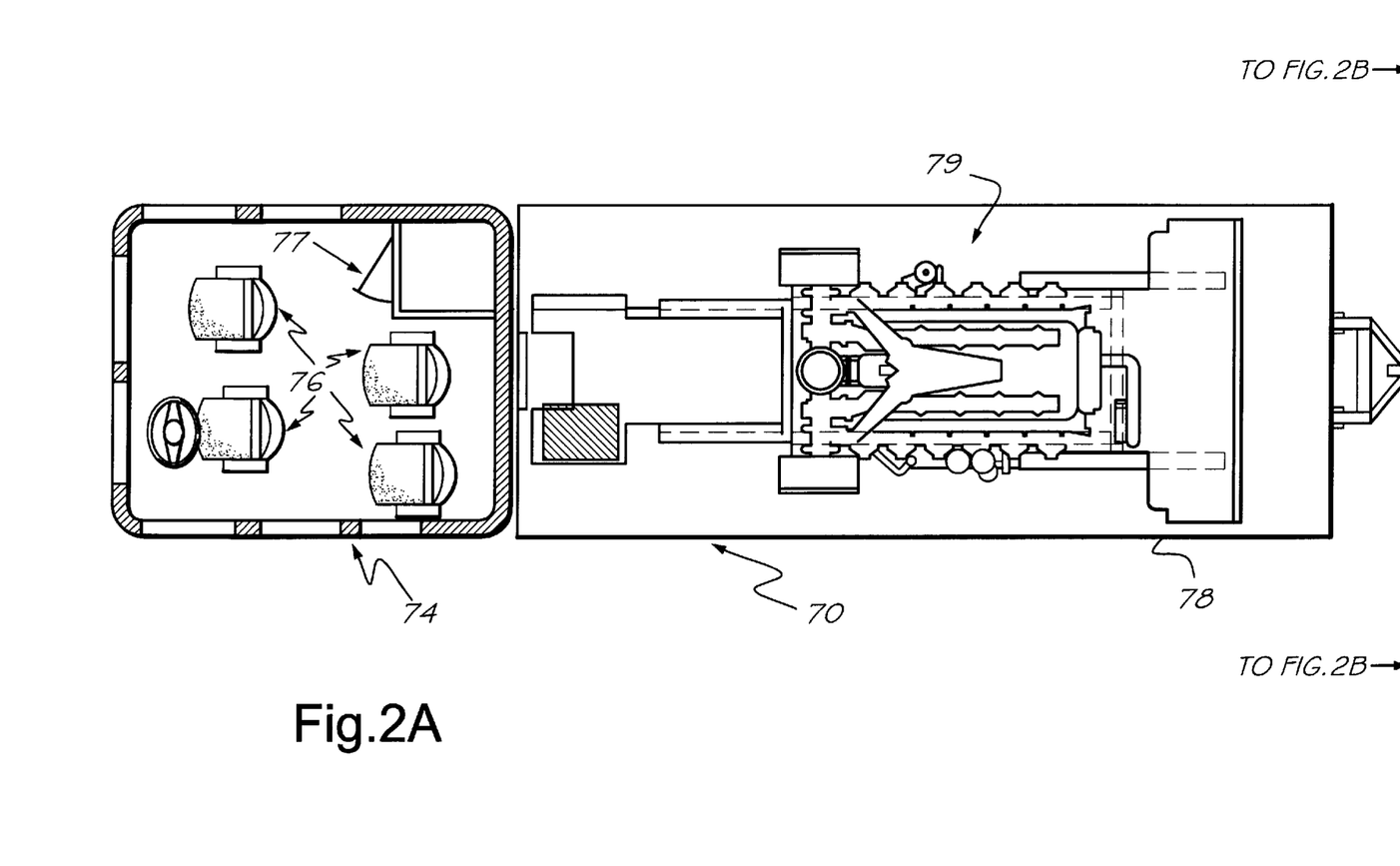
FIGS. 2A and B provide a top plan schematic view of the components of the train according to the invention illustrated in FIG. 1, with some components shown completely schematically for ease of illustration, and other components removed for ease of illustration.
Figure 2B:
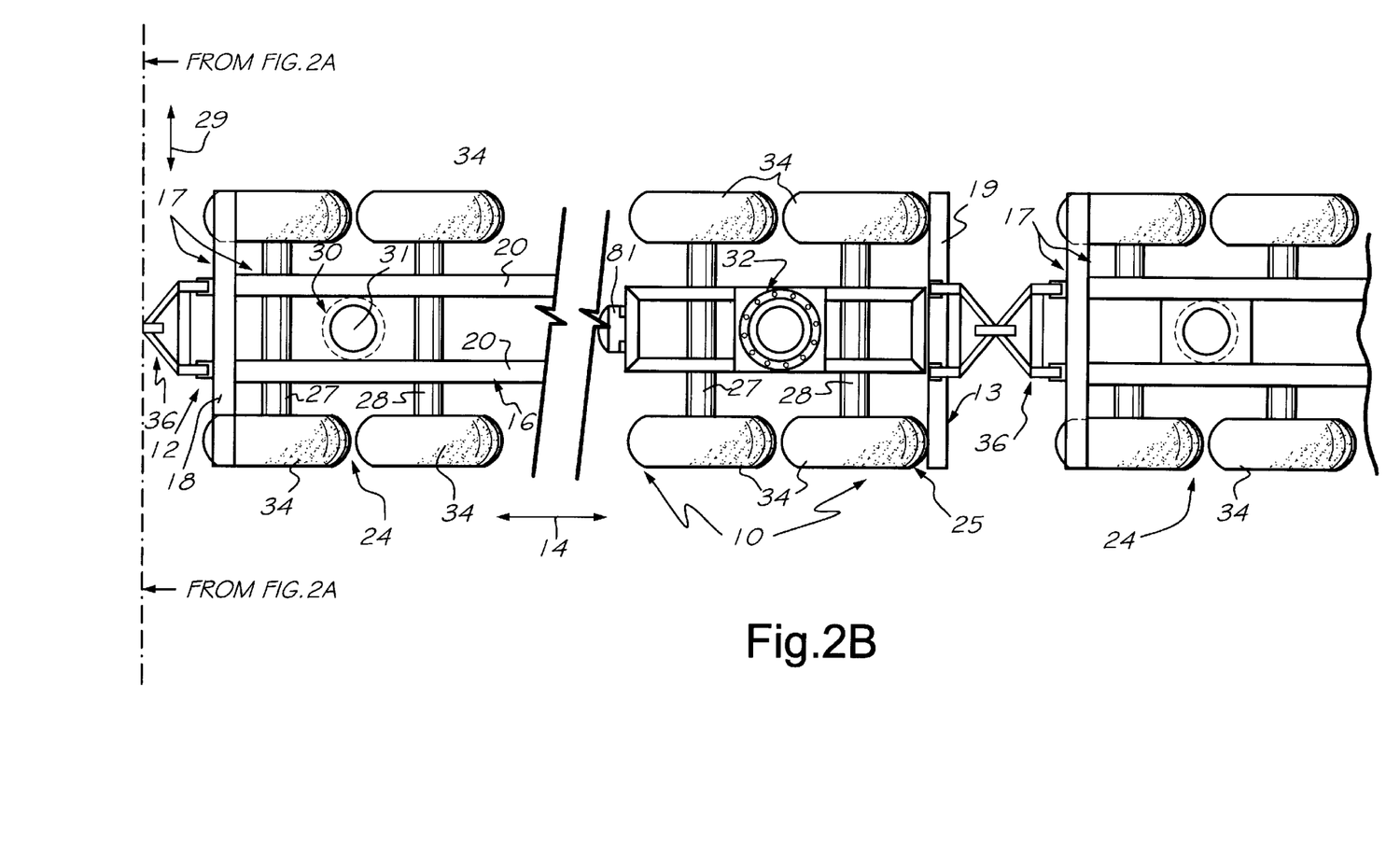

Mounted on the chassis 71 and back of the cab 74, according to the preferred embodiment illustrated in FIGS.

1A and 2A, is a housing 78 which contains a power plant 79 (see FIG. 2A). The power plant 79 preferably comprises a diesel engine or the like which burns diesel fuel to generate electricity. The electricity is then fed from the power plant 79 to motors that are used to drive the lead car 70 as well as typically, one or more of the cars 11. For example, electricity from the power plant 79 would drive the electric motor 80 (see FIG. 1A) mounted on the lead car 70 for powering one of the axles of the rear axle assembly 25, as well as to motors 81 associated with one or more of the cars 11.

The exact manner in which the motors 81 drive the axles with which they are associated is not shown because it is entirely conventional, any suitable conventional transmission and drive arrangement being provided for that purpose. Also, the connection electrical lines between the motors 80, 81 and the power plant 79 are not shown in the drawings, but may comprise any suitable cable arrangement that will not be hurt, nor interfere with, the movement of the vehicle 10. Any number of motors 81 may be provided, associated with one or all of the axles for each of the cars 11, or only provided on selected cars (e.g. one axle on every other car) depending upon the terrain over which the land vehicle 10 must operate.

For the embodiment described, where, for example, ten cars 11 are provided in the land train 10, the land train 10 could be expected to have about a seventy foot turning radius.

Where the terrain is particularly even and firm the power plant 79 may instead merely drive the rear axle assembly 25 of the drive car 70 directly, and not any of the following cars 11, or it may drive the drive car 70 and generate some electricity for just a few electric motors 81 associated with other cars 11.

A wide variety of modifications and enhancements may be provided. For example, the containers 21 may be lined with liners so that they can carry liquid, or some of the cars 11 may be passenger cars or flat bed cars for particularly bulky or long items or equipment. Also, one or more of the cars 11 may be a fuel car providing in some or all of the space thereof a fuel tank for providing diesel fuel to the power plant 79. Alternatively, there may be enough space for fuel tanks in and underneath the drive vehicle 70 itself for enough diesel fuel to power the power plant 79. In some cold weather climates various heating components may be provided—also, for example, powered by the electricity from the power plant 79—for keeping cargo warm, and for keeping lines for the diesel fuel, or the diesel fuel tank, warm so that the diesel fuel may be adequately pumped and burned.

It will thus be seen that according to the present invention a method of transporting cargo or passengers over land in a train is provided that is highly effective. The method comprises the steps of (a) connecting at least four cars 11 together in a land train 10 so that the first axle at the front end (e.g. assembly 24 in the embodiments illustrated in the drawings) of each car 11, except the lead car, is connected to the rear end 13 of the preceding car 11 by a transversely rigid connection 36, and so that each axle (assemblies 24, 25) of each car 11 is spaced substantially an effective longitudinal spacing x (the spacing 57) from the next axle; and (b) powering (e.g. pulling) the front end 12 of the first car 11 (e.g. by connecting it, with a connection 36, to a drive car 70 and/or powering the axles of one or more of the cars 11 with the motors 81) over land in an at least somewhat serpentine path (e.g. 67 in FIG. 7) so that the inflatable tires 34 of each car 11 substantially precisely self track in the path 67 of the inflatable tires 34 of the preceding car 11.

It will thus be seen that according to the present invention a highly effective land vehicle and method are provided for transporting cargo or passengers over land, particularly where there are no paved roads, or no roads at all. While the invention has been herein shown and described in what is presently conceived to be the most practical and preferred embodiment thereof, it will be apparent to those of ordinary skill in the art that many modifications may be made within the scope of the invention, which scope is to be accorded the broadest interpretation of the appended claims so as to encompass all equivalent structures and methods

What is claimed is:

1. A self tracking land vehicle comprising:
   at least four cars, each car having a front end, a rear end, a bottom, and a top, and extending from said front end to said rear end in a generally horizontal longitudinal dimension;
   each car having at least first and second axles with at least two inflatable tires each associated with each of said axles;
   said first axle associated with each car mounted closer to said front end than said rear end of said car, and mounted for pivotal movement about a substantially vertical axis with respect to said car bottom;
   said second axle associated with each car mounted closer to said rear end than said front end, and said second axle mounted with respect to said car bottom so that it does not pivot about a substantially vertical axis;
   a substantially transversely rigid connection from the front end of each first axle of each car to the rear end of a leading car so that said cars are connected together in a land train;
   each car and associated transversely rigid connection of said train having substantially the same length; and
   all of said axles of all of said cars spaced from each other at a substantially uniform effective longitudinal distance apart, so that said land train is self-tracking, all of said cars following substantially the same path of movement.

2. A self tracking land vehicle as recited in claim 1 further comprising a motor or engine for powering at least one axle of each car so that all of said cars are driven.

3. A self tracking land vehicle as recited in claim 1 further comprising a lead drive car, said drive car having a front end with at least one steerable axle with at least two inflatable tires adjacent said front end, and a rear end, and at least one non-steerable axle adjacent said rear end, said non-steerable axle mounted with respect to said drive car so that it cannot pivot about a substantially vertical axis.

4. A self tracking land vehicle as recited in claim 3 further comprising a power plant in said drive car for producing electricity; and further comprising an electric motor for powering at least one axle of every other car of said train, said electric motors receiving electrical energy from said power plant.

5. A self tracking land vehicle as recited in claim 3 wherein said land train comprises at least eight cars.

6. A self tracking land vehicle as recited in claim 1 wherein said first and second axles each comprise a ganged pair of axles, and include a center point; and wherein said center points of all solid cars are spaced from each other substantially the same longitudinal distance.

7. A self tracking land vehicle as recited in claim 1 wherein the substantially transversely rigid connection between cars allows limited vertical relative movement, and pivotal relative movement about a longitudinal central axis, of each car with respect to the preceding car.

8. A self tracking land vehicle as recited in claim 7 wherein said connection comprises two transversely spaced clevis assemblies mounted to each car, and a hinge pin associated with each clevis assembly; a swivel pin; first and second swivel bushings operatively connected to said swivel pin; and first and second wishbone assemblies each operatively connecting a swivel bushing to two hinge pins, so that said cars may move vertically with respect to each other by pivotal movement about said hinge pins, and may move pivotally with respect to each other by pivotal movement of said swivel bushings with respect to each other.

9. A self tracking land vehicle as recited in claim 8 further comprising thrust washers and plates engaging each swivel bushing, and swivel nuts for holding said swivel bushings on said swivel pin.

10. A self tracking land vehicle as recited in claim 1 further comprising a standardized 20 foot container mounted on top of each of a plurality of said cars.

11. A car for a self-tracking land vehicle, comprising:

a chassis having a front end, rear end, bottom, and top, and extending from said front end to said rear end in a generally horizontal longitudinal dimension;

a standardized container mounted on said chassis top;

at least first and second axles with at least two inflatable tires each associated with said chassis;

said first axle mounted closer to said front end than said rear end of said chassis, and mounted on an assembly for pivotal movement about a substantially vertical axis with respect to said chassis bottom;

said second axle mounted closer to said rear end than said front end, and said second axle mounted with respect to said chassis bottom so that is cannot pivot about a substantially vertical axis;

a substantially transversely rigid connection extending outwardly from said first axle assembly past said front end of said chassis which allows limited vertical relative movement, and pivotal relative movement about a longitudinal central axis, of said car with respect to a preceding car; and the distance between each said axle of every said car having the same uniform spacing between each axle; and a motor or engine mounted to said chassis for driving at least one of said axles.

12. A car as recited in claim 11 wherein said substantially transversely rigid connection comprises two transversely spaced clevis assemblies mounted to said car, a hinge pin associated with each clevis assembly, a swivel pin, first and second swivel bushings operatively connected to said swivel pin, and first and second wishbone assemblies each operatively connecting a swivel bushing to two hinge pins so that said car may move vertically with respect to another car to which it is connected by pivotal movement about said hinge pins, and may move pivotally with respect to another car to which it is connected by pivotal movement of said swivel bushings with respect to each other.

13. A car as recited in claim 11 wherein said chassis and said container are each about twenty feet long, and wherein the effective spacing between said first and second axles is about 7–9 feet, and said connection extends longitudinally about 3–5 feet from said axis.

14. A method of transporting cargo or passengers overland in a train using at least four cargo or passenger cars, each having a front end longitudinally spaced from a rear end, a bottom, and a top, and at least front and rear axles, with at least two inflatable tires each, the axles of each car having an effective longitudinal spacing x, and the front axle being freely pivotal with respect to the car bottom about a substantially vertical axis, and the rear axle being fixed to the car bottom; said method comprising the steps of:

(a) connecting the at least four cars together in a land train so that the front axle at the front end of each car, except a lead car, is connected to the rear end of the preceding car by a substantially transversely rigid connection, and so that each axle of each car is spaced substantially uniform the effective longitudinal spacing x from the next axle to provide substantially precise self-tracking; and (b) pulling the front end of the first car over land in an at least somewhat serpentine path so that the inflatable tires of each car substantially precisely self-track in the path of the inflatable tires of the preceding car.

15. A method as recited in claim 14 wherein step (b) is practiced by connecting the front end of the leading car of the land train to the rear end of a drive car, the drive car having a rear axle with inflatable tires spaced from the front axle of the leading cargo or passenger car substantially uniform the effective longitudinal spacing x, and the drive car having steerable front inflatable tires; and by steering the drive car.

16. A method as recited in claim 15 wherein the land train has at least eight passenger or cargo cars and wherein at least some of the cars are cargo cars having a standard transport container mounted on the top thereof; and wherein said method comprises the further steps of driving at least some of the axles of cargo or passenger cars to facilitate movement of the land train over land; and unloading cargo from the train by lifting the container onto, or off of, respectively, the car top.

17. A method as recited in claim 14 wherein the land train has at least eight passenger or cargo cars; and wherein said method comprises the further step of driving at least some of the axles of cargo or passenger cars to facilitate movement of the land train over land.

18. A method as recited in claim 14 wherein at least some of the cars are cargo cars having a standard transport container mounted on the top thereof; and wherein said method comprises the further step of loading and unloading cargo from the train by lifting the container onto, or off of, respectively, the car top.

19. A method as recited in claim 14 wherein step (a) is practiced to allow limited vertical relative movement, and pivotal relative movement about a longitudinal central axis, of each car with respect to the preceding car.

20. A method as recited in claim 14 wherein the drive car includes a power plant for producing electricity, and wherein at least some of the passenger and cargo cars have electric motors for driving an axle or axles thereof; said method comprising the further step of supplying electricity from the power plant to the electric motors of the passenger and cargo cars.

* * * * *